(12) United States Patent
Glaszcz et al.

(10) Patent No.: US 6,874,412 B1
(45) Date of Patent: Apr. 5, 2005

(54) BALE SHAPE MONITORING SYSTEM FOR A ROUND BALER

(75) Inventors: Anthony J. Glaszcz, Hartford, WI (US); Kim P. Viesselmann, Grafton, WI (US)

(73) Assignee: Gehl Company, West Bend, WI (US)

( * ) Notice: Subject to any disclaimer, the term of this patent is extended or adjusted under 35 U.S.C. 154(b) by 23 days.

(21) Appl. No.: 09/927,960

(22) Filed: Aug. 10, 2001

(51) Int. Cl.[7] .................................... B30B 15/14
(52) U.S. Cl. ........................ 100/47; 100/87; 100/88; 56/341
(58) Field of Search .................... 100/88, 87, 89, 100/4, 13, 17, 18, 47, 48, 49, 50; 56/341, 342, 343

(56) References Cited

U.S. PATENT DOCUMENTS

| | | | |
|---|---|---|---|
| 4,224,867 A | | 9/1980 | Gaeddert et al. |
| 4,517,795 A | * | 5/1985 | Meiers .................. 56/341 |
| 5,165,332 A | * | 11/1992 | Lee ...................... 100/88 |
| 5,444,969 A | * | 8/1995 | Wagstaff et al. ......... 56/341 |
| 5,551,218 A | * | 9/1996 | Henderson et al. ...... 53/504 |
| 5,615,544 A | * | 4/1997 | Berger et al. ........... 56/341 |
| 5,802,825 A | * | 9/1998 | Chow et al. ............ 56/341 |
| H1819 H | * | 12/1999 | Anderson et al. ....... 56/341 |

* cited by examiner

Primary Examiner—Allen Ostrager
Assistant Examiner—S Self
(74) Attorney, Agent, or Firm—Boyle, Fredrickson, Newholm, Stein & Gratz, S.C.

(57) ABSTRACT

A bale shape monitoring system for a round baler for detecting a misshapen bale during bale formation. The system includes a pair of spaced apart rollers mounted to a movable member located within the bale-forming chamber, and which are normally engaged with spaced apart baler belts when the bale has a uniform diameter in the vicinity of the rollers. A rotation sensing arrangement detects the rotation of the rollers, caused by engagement of the rollers with the belts during normal bale formation. In the event the bale is formed with a lesser diameter in the vicinity of one of the rollers, the associated belt moves out of contact with the roller, and the lack of roller rotation is sensed so as to provide a signal to the operator to steer the baler to supply crop material to the lesser diameter area of the bale. Once a uniform diameter is again obtained, both rollers continue to rotate so as to indicate to the operator that the bale has a uniform diameter.

17 Claims, 4 Drawing Sheets

BALE SHAPE MONITORING SYSTEM FOR A ROUND BALER

BACKGROUND AND SUMMARY OF THE INVENTION

This invention relates to a baler for forming round bales of crop material, and more particularly to a system for detecting a differential in bale diameter during formation of a round bale within a bale-forming chamber defined by the round baler.

Balers for forming round bales of agricultural crop material typically have a crop pick-up arrangement which supplies crop material to the bale-forming chamber through a crop inlet. Prior to baling, crop material is typically cut and placed in windrows on the ground, and the windrows are then fed by the pick-up arrangement into the bale-forming chamber. In order to form a bale having a uniform diameter throughout its length, the operator of the round baler must constantly alter the position of the baler relative to the windrow, to ensure that the crop material is supplied to different areas of the bale-forming chamber through the crop inlet. Commonly, operators have a tendency to supply a greater amount of crop material to the central area of the bale-forming chamber than to the end areas, resulting in a bale having an oblong shape.

Various bale shape monitors have been developed in an effort to overcome this problem. Examples of prior art bale shape monitors are shown in Gaeddert et al U.S. Pat. No. 4,224,867 issued Sep. 30, 1980. The '867 patent discloses a bale shape monitor which senses the tension in the endmost baler belts. Since a belt in an area of lesser bale diameter will have a lesser degree of tension than a belt in an area of greater bale diameter, the presence of a differential in belt tension is used to indicate a differential in bale diameter. While this type of bale shape monitor indicates a differential in bale diameter, it is disadvantageous in that it relies upon sensing the condition of certain baler components in order to sense a differential in bale diameter, i.e. the sensing of bale diameter differential is indirect. Furthermore, this involves dedicated components which must be assembled to the baler within tight tolerances in order to obtain accurate information pertaining to a differential in bale diameter.

It is an object of the present invention to provide a bale shape monitoring or sensing system which is located within the bale-forming chamber and which provides direct detection of a differential in bale diameter. It is a further object of the invention to provide a bale shape monitoring or sensing system which is adapted to be employed in combination with a preexisting component of the baler, which is normally located within the bale-forming chamber of the baler. Yet another object of the invention is to provide a bale shape monitoring or sensing system which is accurate and sensitive, and which is capable of promptly providing a signal to an operator so as to enable the operator to reposition the baler so as to correct the shape of the bale. A still further object of the invention is to provide such a bale shape monitoring or sensing system which is relatively simple in its components, construction and operation, yet which is capable of providing prompt and accurate signal to alert the operator of a differential in bale diameter.

In accordance with the invention, a bale shape sensor or monitor for a round baler having a bale-forming chamber includes a movable member located within the bale-forming chamber and at least a pair of spaced apart rollers rotatably mounted to the movable member. The movable member is adapted to move in response to growth of the bale within the bale-forming chamber. The rollers are arranged to rotate in response to contact with the baler belts as the bale rotates within the bale-forming chamber. A sensor arrangement is associated with the rollers, for sensing rotation of the rollers and for outputting a signal when at least one of the rollers ceases to rotate or rotates at a speed below a predetermined threshold, to indicate a differential in bale diameter in the vicinity of the rollers. In a preferred form, the movable member is in the form of a laterally rigid frame member which extends across the bale-forming chamber, and the rollers are preferably engaged with the endmost belts to indicate a differential in bale diameter at the ends of the bale. The movable member may be configured so as to move outwardly in response to contact between the movable member and the bale at a location between the rollers. The movable member may be in the form of a frame assembly having a series of bale-starting fingers or the like, which extend through the spaces between the belts and engage the crop material during initial formation of the bale, to assist in directing the crop material during formation of the bale. The bale shape sensor or monitor further includes an indicator which is interconnected with the sensor arrangement, for providing a sensory output to the operator indicating the area of the bale having a lesser diameter. The operator then controls the position of the baler so as to supply material to the crop inlet at the lesser diameter area of the bale.

The invention further contemplates an improvement in a round baler and a method of detecting a differential in bale diameter during bale formation, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
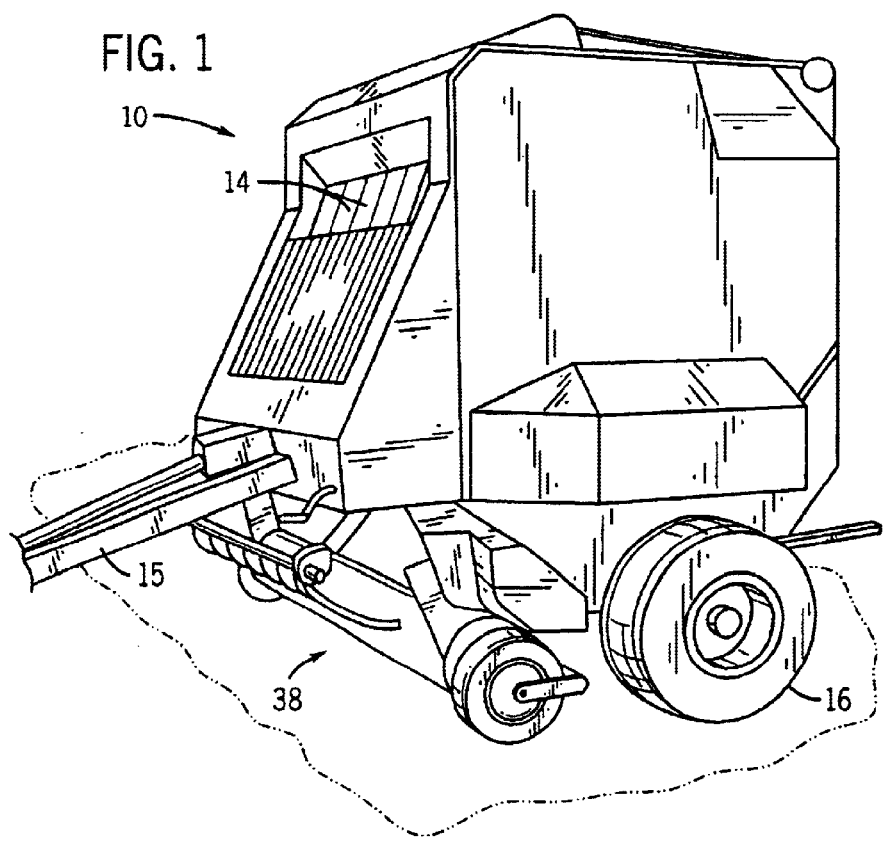
FIG. 1 is an isometric view of a round baler incorporating the bale shape sensor or monitor of the present invention.
Figure 2:
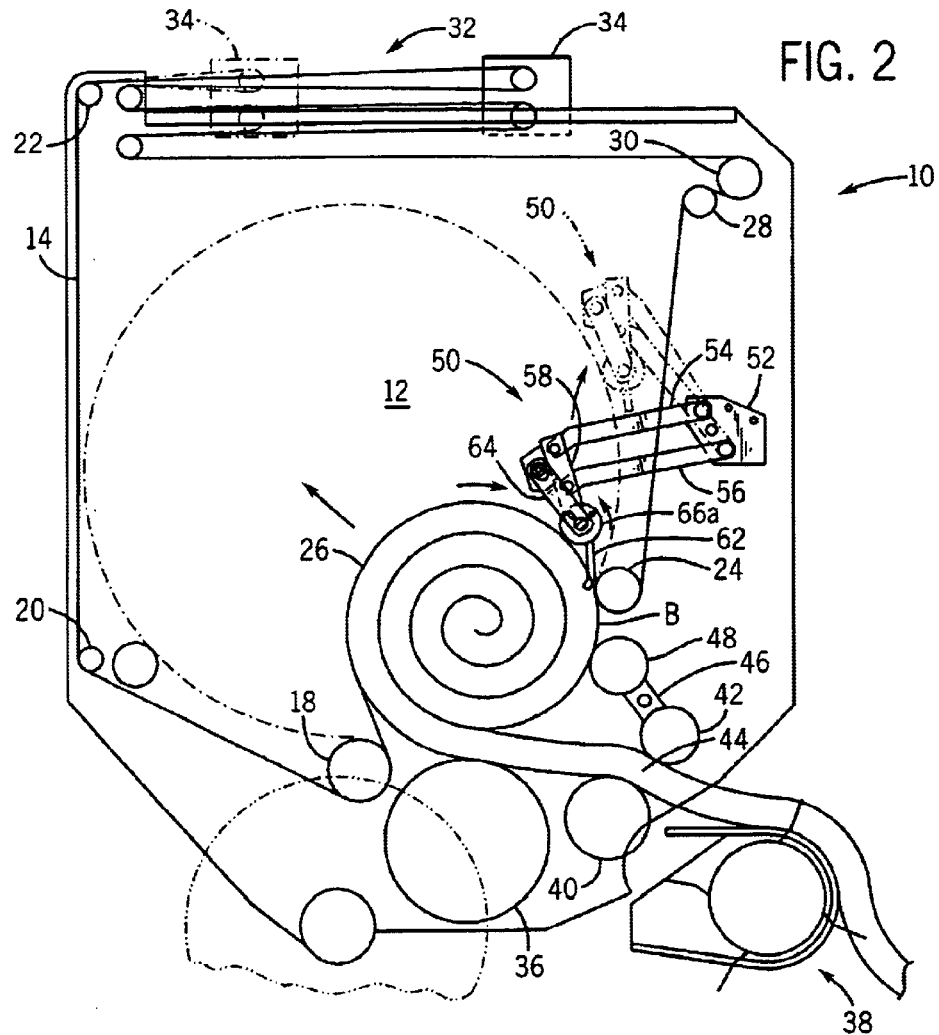
FIG. 2 is a schematic side elevation view of the round baler of FIG. 1, showing engagement of the bale shape sensor or monitor of the present invention with the bale during bale formation.

FIGS. 1 and 2 illustrate a round baler 10 incorporating the bale shape sensing or monitoring system of the present invention. Round baler 10 defines an internal bale-forming chamber 12 within which a series of side-by-side belts 14 are located. In accordance with conventional baler construction, round baler 10 includes a tongue 15 adapted to be engaged with a tow vehicle such as a tractor, and a pair of wheels 16 which allow baler 10 to move along the ground. Belts 14 of baler 10 are trained about a series of rollers which extend between the side sheets of baler 10. The belt rollers include a lower penetrating roll 18, a lower rear idler roll 20, an upper rear idler roll 22, and a lower front idler roll 24 spaced from lower penetrating roll 18, and between which a bale-forming run 26 of belts 14 is located. Belts 14 are further engaged with a pair of upper front idler rolls 28, 30, and a take-up assembly 32 which includes a movable shuttle 34. In a manner as is shown, shuttle 34 of take-up mechanism 32 moves rearwardly as bale-forming run 26 of belts 14 expands during bale growth.

Belts 14 are adapted to roll crop material supplied to bale-forming chamber 12 into a round bale B, which is supported by a floor roll 36. Crop material is picked up from the ground by a pick-up assembly 38, and is supplied to a power infeed system which includes a lower fixed power infeed roll 40 and an upper pivoting power infeed roll 42, which define a space 44 therebetween through which crop material is supplied to bale-forming chamber 12. Upper pivoting power infeed roll 42 is mounted between a pair of arms 46, which are pivotable about a stripper roll 48. These components are shown and described in copending application Ser. No. 09/636,427 filed Aug. 10, 2000, the disclosure of which is hereby incorporated by reference. As described therein, crop material is supplied from pick-up assembly 38 rearwardly to space 44 between lower and upper infeed rolls 40, 42, respectively, which cooperate to aggressively feed the crop material rearwardly toward the bale starting area defined by bale-forming run 26 of baler belts 14 between lower penetrating roll 18 and front idler roll 24.

Figure 3:
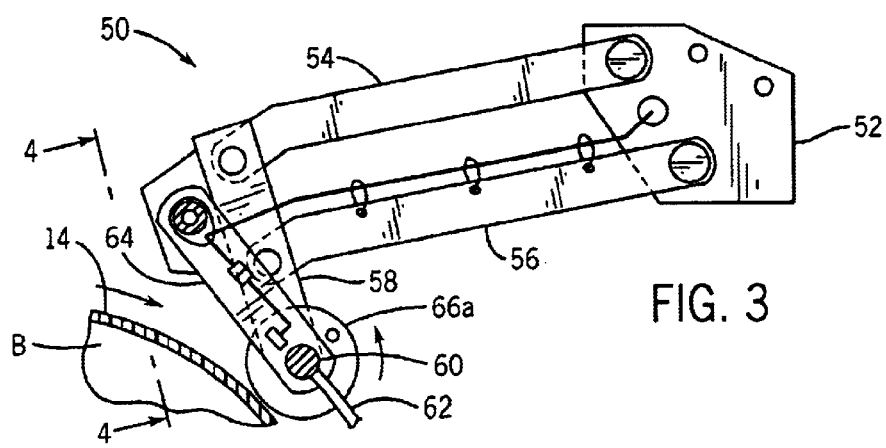
FIG. 3 is an enlarged partial side elevation view showing a portion of the components of the baler of FIG. 2 which carry the bale shape sensor or monitor of the present invention.

In accordance with known construction, a starting finger assembly 50 is mounted between the side sheets of baler 10 for assisting in directing crop material within bale-forming 12 during formation of the bale. As shown in FIGS. 2 and 3, starting finger assembly 50 includes a pair of mounting brackets 52 secured one to each side sheet of baler 10. A push arm 54 and a pivot arm 56 are mounted to each bracket 52. A mounting arm 58 is pivotably mounted to each of push arm 54 and pivot arm 56. A finger bar 60 extends between the lower ends of mounting arms 58, and carries a series of starting fingers 62. A support arm 64 extends between the outer end of push arm 54 and finger bar 60, and an actuator cam is interposed between push arm 54 and support arm 64. A pair of rollers 66a, 66b are mounted one to each end of finger bar 60. These components of starting finger assembly 50 make up a laterally rigid frame assembly extending across bale-forming chamber 12.

In a manner as is known, starting finger assembly 50 is movable between an initial operative position, such as shown in solid lines in FIG. 2, and a final inoperative position as shown in phantom in FIG. 2. In the operative position, starting fingers 62 extend through the spaces between belts 14 and assist in directing crop material downwardly and inwardly so as to form the core of bale B. Rollers 66a, 66b ride on the endmost ones of belts 14, which causes starting finger assembly 50 to move upwardly and forwardly as bale B grows within bale-forming chamber 12. When bale B has reached a predetermined size, starting fingers 62 are moved out of engagement with bale B by virtue of the configuration of push arm 54, pivot arm 56, mounting arm 58 and support arm 64.

In accordance with the present invention, a bale shape sensing or monitoring system is incorporated into starting finger assembly 50. The bale shape sensing or monitoring system is operable to detect an end-to-end differential in bale diameter utilizing rollers 66a, 66b. To accomplish this, the present invention employs a rotation sensing system to detect whether either or both of rollers 66a, 66b have stopped rotation or are rotating at a speed less than that which is attained by virtue of engagement of rollers 66a, 66b with their associated belts 14.

In one embodiment, rotation of rollers 66a, 66b is sensed by pair of a reed switches 68a, 68b, each of which includes a sensor 70 mounted to a sensor plate 72 secured to finger bar 60 in a manner to be explained. A magnet 74 embedded within the inner end area of each roller 66a, 66b, and is positioned so as to pass by sensor 70 during rotation of rollers 66a, 66b. Details of these components for one end of finger bar 60 are shown in FIGS. 5 and 6, with the understanding that the same description applies to the components at the opposite end of finger bar 60 in a mirror image fashion.

Figure 5:
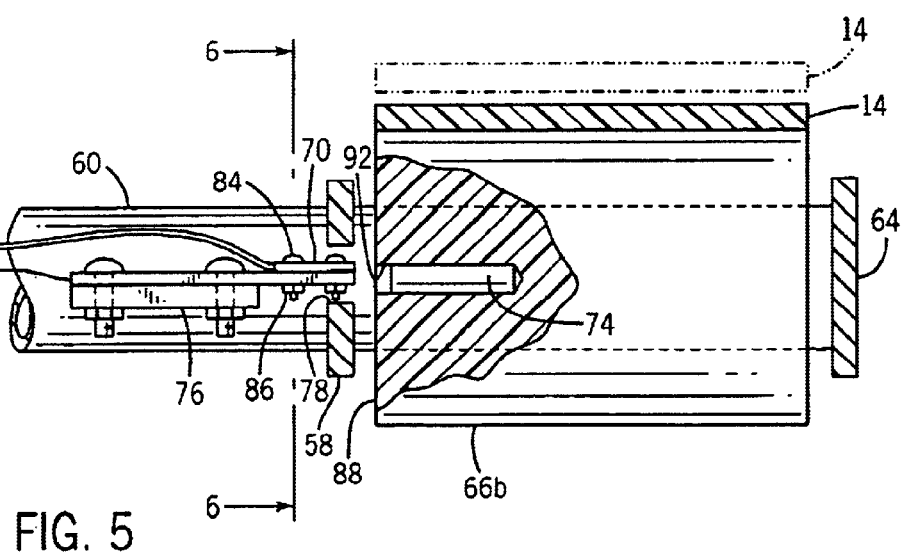
FIG. 5 is a partial section view taken along line 5—5 of FIG. 4.
Figure 6:
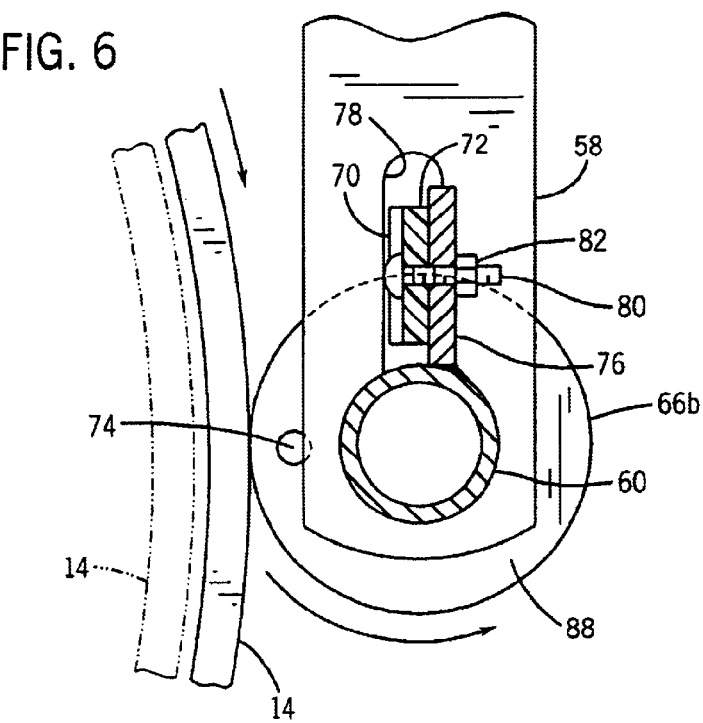
FIG. 6 is a partial section view taken along line 6—6 of FIG. 5.

As shown in FIGS. 5 and 6, a sensor mounting member 76 is secured to finger bar 60 in any satisfactory manner, such as by welding. Sensor mounting member 76 is located inwardly of mounting arm 58, which has a slot 78 formed in its outer end adjacent finger bar 60. Sensor plate 72 has a pair of openings, which may be in the form of slots, in alignment with a pair of openings in sensor mounting member 76, and is secured to sensor mounting member 76 by means of a pair of screws 80 extending through the aligned openings, and nuts 82 secured to screws 80. Reed switch sensor 70 is mounted to the inner end of sensor plate 72 via a pair of nuts 84 and screws 86. The inner end of sensor plate 72 and reed switch sensor 70 extend into slot 78 in mounting arm 58, and are located in close proximity to an end surface 88 defined by roller 66b. A sensor wire 90 extends from reed switch sensor 70 to reed switch 68b, in accordance with known construction. Representatively, reed switches 68a, 68b and reed switch sensors 70 may be that such as is available from Power Components, Inc. of Mishawaka, Ind. under its Model No. PS60-B74-06, although it is understood that any other satisfactory type of magnetic sensing switch may be employed.

A passage 92 is formed in roller 66b, extending inwardly from its end surface 88. Magnet 74 is received within passage 92, and is maintained within passage 92 in any satisfactory manner, such as by means of a press-fit arrangement or by an adhesive disposed within passage 92. Magnet 74 is located such that sensor 70 detects the presence of magnet 74 as magnet 74 passes sensor 70 during rotation of roller 66.

Figure 7:
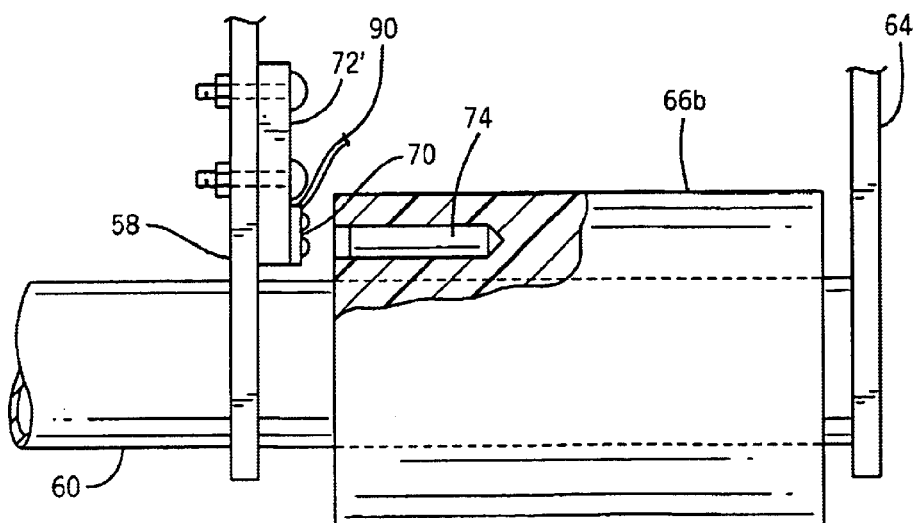
FIG. 7 is a view similar to FIG. 5, showing an alternative arrangement for sensing roller rotation.

FIG. 7 illustrates an alternative mounting arrangement, in which slot 78 is eliminated and a sensor plate 72' is mounted to the outer surface of mounting arm 58. Reed switch sensor 70 is mounted to the end of sensor plate 72, so as to be in alignment with magnet 74.

Figure 4:
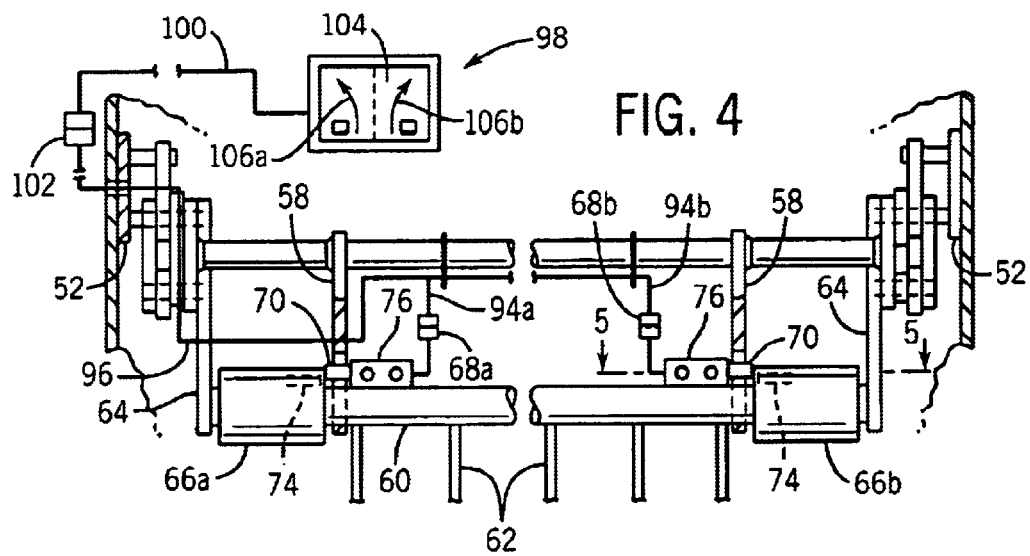
FIG. 4 is an end elevation view of the bale shape sensor or monitor of the present invention, with reference to line 4—4 of FIG. 3.

Referring to FIG. 4, a pair of wires 94a, 94b extend from reed switches 68a, 68b, respectively, and merge into a single wire 96, which is interconnected with a steering monitor output box 98 via a wire 100 which is engaged with wire 96 through a mating connector assembly 102. Steering monitor box 98 includes a display 104 having a pair of steering indicator arrows 106a, 106b. Signals from switches 68a, 68b are supplied through wires 96, 100 to output logic on a circuit board contained within steering monitor box 98, which also includes LEDs or other illumination means for selectively illuminating indicator arrows 106a, 106b.

Figure 4A:
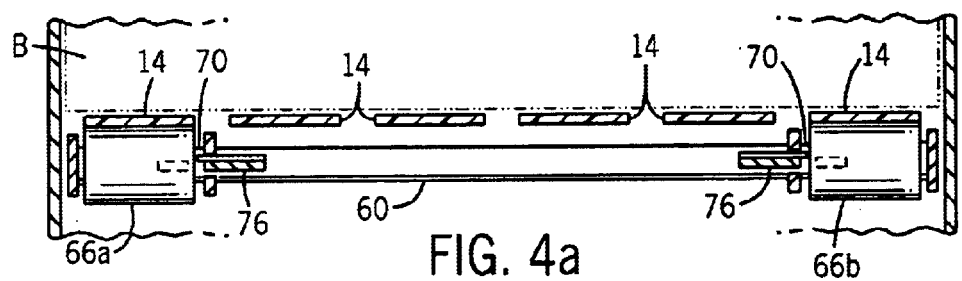
FIGS. 4a–4c are schematic views of the bale shape sensor or monitor of FIG. 4, in different positions relative to the bale during bale growth.

In operation, the bale shape sensing or monitoring system of the invention functions as follows, with reference to FIGS. 4a–4c. When bale B is being formed correctly in bale-forming chamber 12, both rollers 66a and 66b remain in contact with the respective end belts 14, which is in direct engagement with the outer surface of bale B during its formation. As long as the diameter of bale B at the ends of bale-forming chamber 12 is equal, as shown in FIG. 4a, rollers 66a and 66b continue to rotate by virtue of engagement of rollers 66a, 66b with the outer surface of the respective underlying baler belts 14. As long as each roller 66a, 66b continues rotating at a speed above a predetermined threshold, switches 66a and 66b are actuated at a predetermined frequency, which is determined to be satisfactory by the logic contained within steering monitor box 98, and neither of arrows 106a, 106b are illuminated.

Figure 4B:
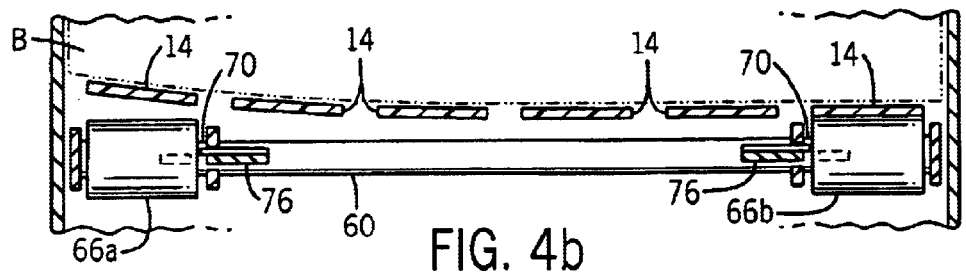

If bale B is being formed so that the diameter of bale B is less at one end than at the other, as shown in FIG. 4b, starting finger assembly 50 moves outwardly by virtue of engagement of roller 66b with its associated belt 14 and the rigid construction of the frame of starting finger assembly 50, causing roller 66a at the lesser diameter end of bale B to move out of contact with its associated belt 14. As a result, roller 66a ceases to rotate, or rotates at a very slow speed, typically in an erratic fashion, by contact with crop material which extends outwardly between belts 14 or between the endmost belt 14 and the baler side sheet. This prevents magnet 74 from actuating reed switch 60a, or causes reed switch actuation at a frequency less than that of reed switch 68b at the opposite end of bale B, which continues to be actuated at a frequency corresponding to full engagement of roller 66b with its associated belt 14. The logic contained within steering monitor box 98 illuminates indicator arrow 106a, to provide a visual indication to the operator that baler 10 should be positioned relative to the crop windrow so as to supply crop material to the end of bale-forming chamber 12 corresponding to the location of roller 66a. Arrow 106a continues to be illuminated until belt 14 moves into contact with roller 66a, which causes roller 66a to resume rotation so that the actuation frequency of reed switch 68a matches that of reed switch 68b. This matching of reed switch actuation is detected by the logic of steering monitor box 98, such that steering indicator arrow 106a is no longer illuminated. The operator then continues normal bale formation until a lesser bale diameter at either end of bale B is again detected in the manner described.

Figure 4C:
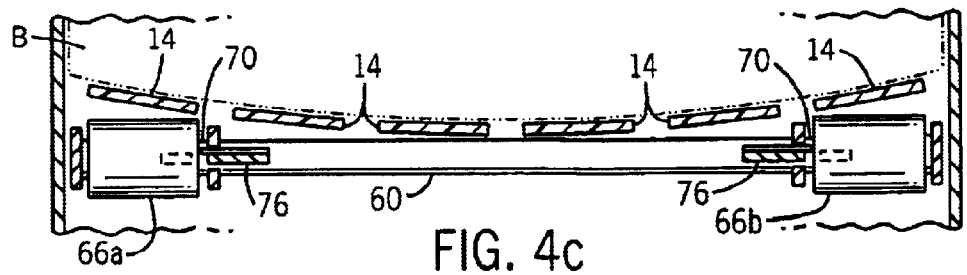

FIG. 4c illustrates a condition in which the central area of bale B has a diameter greater than both ends of bale B, such that both rollers 66a, 66b are moved out of contact with their associated belts 14. During initial bale formation, starting finger assembly 50 continues to move outwardly by virtue of engagement of starting fingers 62 with bale B, which can result in outward movement of finger bar 60 even when neither roller 66a, 66b is engaged with its associated belt 14. When this occurs and both rollers 66a, 66b either stop rotation or rotate at a frequency below that which corresponds to full engagement with the associated belt 14, the logic of steering monitor box 98 functions to illuminate both arrows 106a, 106b, to provide an indication to the operator that additional crop material is required for both ends of bale B. The operator then repositions baler 10 relative to the crop windrow to supply crop material to the ends of bale-forming chamber 12, until the ends of bale B attain a diameter which causes the end belts 14 to once again engage rollers 66a, 66b, at which time both arrows 106a, 106b are no longer illuminated.

During later stages of bale formation when starting fingers 62 are moved out of contact with bale B, the condition of FIG. 4c can be attained by direct engagement of the central baler belts 14 with finger bar 60, causing starting finger assembly 50 to move outwardly even without contact of rollers 66a, 66b with the end baler belts 14. In this condition, finger bar 60 provides a reference corresponding to the maximum bale diameter at any given time during bale formation. The same holds true for the condition of FIG. 4c, which results from outward movement of finger bar 60 by engagement of starting fingers 62 with bale B.

While particular details of the present invention have been shown and described, it is understood that alternative details are contemplated as being within the scope of the present invention. For example, and without limitation, any type of rotation sensing mechanism may be employed in place of the magnet and reed switch combination shown and described, to provide information regarding roller rotation. Further, while the differential in bale diameter has been described in connection with providing a visual output to the operator as to the direction to steer baler 10, it is understood an audio or other sensory output signal could be utilized to alert the operator as to a differential in bale diameter. In addition, the sensed differential in bale diameter could be used in combination with an automatic baler positioning system to automatically position baler 10 independently of the operator. While the bale shape monitoring system of the present invention has been shown and described as being associated with a preexisting baler component, i.e. the starting finger assembly, it is understood that the same type of system may be a dedicated bale shape sensing system and need not be associated with existing bale components. Alternatively, the bale shape monitoring system of the invention may be used in combination with any type of movable structure located within the bale-forming chamber, such as arms that carry a belt-engaging roller and which have a portion located in close proximity to the bale belts during bale growth, to which rollers such as 66a, 66b may be mounted. Further, while the system of the invention provides bale shape monitoring by engagement with the endmost baler belts, information regarding bale diameter could be obtained at any location along the length of the bale by positioning a roller such as 66a, 66b at the desired location, e.g. at the center of the bale, to provide information regarding bale diameter at other locations along the length of the bale.

The invention has been described in connection with sensing a stoppage of roller rotation, or sensing roller rotation at a speed below a predetermined threshold, in order to detect a differential in bale diameter. Alternatively, it is possible to sense a differential between the speed of rotation of the rollers in order to detect a differential in bale diameter. Further, while the invention has been described with reference to a rigid member which moves one of the rollers out of contact with the baler belt when the other roller is moved radially outward due to a differential in bale diameter, alternative arrangements are contemplated as being within the scope of the present invention. For example, a laterally flexible frame or other structure may be utilized in place of a rigid frame, which results in both rollers remaining in contact with the baler belts regardless of a differential in bale diameter. In this arrangement, the rollers rotate at different rates of speed due to the differential in bale diameter, and the sensed differential in roller speed is employed to output a signal indicating a differential in diameter of the bale.

It can thus be appreciated that the present invention provides a highly accurate bale shape detection system by directly engaging the area of the belts which are in contact with the bale during bale formation. The invention is relatively simple in its components and operation, yet provides accurate and sensitive bale diameter differential detection due to the predictable roller rotation which is attained when the baler belt is in contact with the roller. The system can either be incorporated into baler 10 at the time of manufacture, or can be retrofit onto baler 10 with relatively minor modifications in the components of baler 10.

Various alternatives and embodiments are contemplated as being within the scope of the following claims particularly pointing out and distinctly claiming the subject matter regarded as the invention.

We claim:

1. A bale shape monitor for a round baler having a bale-forming chamber defined by a series of side-by-side belts, comprising:

a movable member located within the bale-forming chamber, wherein the movable member is adapted to move in response to outward movement of the belts caused by growth of the bale within the bale-forming chamber;

first and second spaced apart rollers rotatably mounted to the movable member, wherein the movable member is configured such that the rollers are arranged to engage at least a spaced apart pair of underlying belts when the bale is uniform in diameter in the locations of the rollers, such that the first and second rollers rotate at a speed of rotation above a predetermined threshold in response to movement of the underlying belts to rotate the bale within the bale-forming chamber, and wherein the movable member is configured such that the first roller is moved out of engagement with the underlying belt when the bale is not uniform in diameter in the locations of the rollers, wherein movement of the first roller out of engagement with the underlying belt results in the first roller not rotating above the threshold speed of rotation; and a sensor arrangement associated with the rollers, wherein the sensor arrangement is configured to sense rotation of the rollers above the threshold speed of rotation and to output a signal when the first roller is not rotating above the threshold speed of rotation due to movement of the first roller out of engagement with the underlying belt, wherein the signal indicates a reduced diameter of the bale in the vicinity of the first roller.

2. The bale shape monitor of claim 1, wherein the movable member comprises a laterally rigid frame which extends across the bale-forming chamber.

3. The bale shape monitor of claim 2, wherein the laterally rigid frame is configured to contact one of the belts located between the spaced apart pair of belts.

4. The bale shape monitor of claim 3, wherein the laterally rigid frame carries a series of bale starting members which direct crop material during formation of the bale.

5. The bale shape monitor of claim 1, further comprising a steering indicator interconnected with the sensor arrangement for providing a sensory output to an operator of the round baler indicating the area of the bale having a reduced diameter.

6. A method of detecting a differential in bale diameter in a round bale as the round bale is formed in the bale-forming chamber of a round baler, comprising the steps of:

positioning a pair of rotatable members on a frame located within the bale-forming chamber, wherein the rotatable members are laterally spaced apart from each other and wherein the rotatable members are arranged to engage the bale to rotate in response to rotation of the bale within the bale-forming chamber, and to move radially outwardly along with the bale in response to growth of the bale within the bale-forming chamber, and wherein the frame is configured such that a differential in bale diameter in the locations of the rotatable members results in one of the rotatable members moving out of engagement with the bale;

forming a bale within the bale-forming chamber;

sensing rotation of the rotatable members during formation of the bale within the bale-forming chamber; and outputting a signal in response to sensing rotation of the rotatable members when one of the rotatable members rotates at a speed of rotation above a predetermined threshold due to engagement with the bale, and the other of the rotatable members moves out of engagement with the bale and does not rotate above the threshold speed of rotation, wherein the rotation of only one of the rotatable members above the threshold speed of rotation indicates a differential in bale diameter during growth of the bale within the bale-forming chamber in the vicinity of the rotatable members.

7. The method of claim 6, wherein the step of sensing rotation of the rotatable members during formation of the bale is carried out by interconnecting a rotation sensing arrangement between the frame and each rotatable member.

8. The method of claim 6, wherein the frame is configured to contact the bale at a location between the pair of rotatable members.

9. The method of claim 6, wherein the step of outputting a signal is carried out by outputting a sensory signal which provides an indicator to the operator of the round baler as to the side of the bale having a lesser diameter.

10. In a round baler having a bale-forming chamber and a movable member which moves radially outwardly along with the bale during formation of the bale within the bale-forming chamber, the improvement comprising first and second spaced apart rotatable members mounted to the movable member, wherein the first and second rotatable members engage the bale and rotate at a speed of rotation above a threshold speed of rotation when the bale diameter is substantially uniform, and wherein the first rotatable member is moved out of engagement with the bale by movement of the movable member when the diameter of the bale is less in the vicinity of the first rotatable member than in the vicinity of the second rotatable member, such that the first rotatable member does not rotate above the threshold speed of rotation and the second rotatable member rotates above the threshold speed of rotation, and a sensor arrangement associated with the first and second rotatable members for detecting rotation of the rotatable members, wherein the sensor arrangement is configured to detect when the speed of rotation of the first rotatable member is below the threshold speed of rotation and the speed of rotation of the second rotatable member is above the threshold speed of rotation, to indicate a reduced diameter of the bale in the vicinity of the first rotatable member.

11. The improvement of claim 10, wherein the sensor arrangement comprises a switch mechanism interposed between the movable member and each rotatable member for detecting rotation of the rotatable members relative to the movable member.

12. The improvement of claim 10, wherein the sensor arrangement is operable to detect a differential in the frequency of rotation between the rotatable members.

13. The improvement of claim 12, wherein the movable member contacts the bale at a location between the rotatable members.

14. The improvement of claim 13, wherein the baler includes a series of belts, and wherein the rotatable members are arranged to contact the belts which engage an outer surface defined by the bale during formation of the bale within the bale-forming chamber.

15. The improvement of claim 10, further comprising an indicator interconnected with the sensor arrangement for providing an indication as to a differential in bale diameter in the vicinity of the rotatable members.

16. The improvement of claim 15, wherein the indicator comprises a sensory output arrangement for outputting a signal to an operator of the round baler indicating a lesser diameter of the bale in the vicinity of the first rotatable member.

17. A bale shape monitor for a round baler having a bale-forming chamber, comprising:

a movable member located within the bale-forming chamber, wherein the movable member is adapted to move in response to growth of the bale within the bale-forming chamber;

a pair of spaced apart rollers rotatably mounted to the movable member, wherein the rollers are arranged to rotate in response to rotation of the bale within the bale-forming chamber;

a sensor arrangement associated with the rollers, wherein the sensor arrangement is configured to sense rotation of the rollers and to output a signal in response to a sensed differential in the speed of rotation of the rollers, wherein the signal indicates a differential in the diameter of the bale in the vicinity of the rollers; and wherein the sensor arrangement includes a magnet received within a passage defined by each roller, wherein the magnet rotates with the roller to sense rotation of the roller.

* * * * *